(12) United States Patent  
DeAngelis et al.

(10) Patent No.: US 8,348,048 B2  
(45) Date of Patent: Jan. 8, 2013

(54) DEFLECTION APPARATUS FOR A CONVEYING SYSTEM

(75) Inventors: Marco DeAngelis, Zurich (CH); Erwin Muller, Durnten (CH)

(73) Assignee: WRH Walter Reist Holding AG, Ermatingen (CH)

( * ) Notice: Subject to any disclaimer, the term of this patent is extended or adjusted under 35 U.S.C. 154(b) by 297 days.

(21) Appl. No.: 12/678,436

(22) PCT Filed: Jul. 17, 2008

(86) PCT No.: PCT/CH2008/000319  
§ 371 (c)(1),  
(2), (4) Date: Jun. 26, 2010

(87) PCT Pub. No.: WO2009/036581  
PCT Pub. Date: Mar. 26, 2009

(65) Prior Publication Data  
US 2010/0263993 A1    Oct. 21, 2010

(30) Foreign Application Priority Data

Sep. 17, 2007  (CH) .................................. 1448/07  
Apr. 23, 2008  (WO) ................ PCT/CH2008/000184

(51) Int. Cl.  
*B65G 17/24*  (2006.01)

(52) U.S. Cl. ........................................ 198/779; 198/831

(58) Field of Classification Search ............... 198/861.2, 198/367, 779, 831, 836.1, 836.3, 836.4, 839, 198/840, 842  
See application file for complete search history.

(56) References Cited

U.S. PATENT DOCUMENTS

| 3,985,225 | A | * | 10/1976 | Baum et al. ................... 198/834 |
| 5,174,437 | A | * | 12/1992 | Burger .......................... 198/842 |
| 5,306,212 | A | | 4/1994 | Eberle |
| 5,415,274 | A | * | 5/1995 | Krismanth et al. ........... 198/833 |
| 6,964,333 | B2 | * | 11/2005 | Ledingham ................... 198/841 |
| 7,431,150 | B2 | * | 10/2008 | Ranger ....................... 198/836.3 |
| 8,162,132 | B2 | * | 4/2012 | Muller .......................... 198/779 |
| 2010/0038212 | A1 | | 2/2010 | Seger et al. |
| 2010/0263993 | A1 | | 10/2010 | DeAngelis et al. |

FOREIGN PATENT DOCUMENTS

| DE | 37 26 059 | 12/1988 |
| DE | 101 35 659 | 2/2003 |
| DE | 10135659 | 2/2003 |
| EP | 1340698 | 9/2003 |
| EP | 2154089 | 2/2010 |
| FR | 2 196 281 | 3/1974 |
| WO | 99/35063 | 7/1999 |
| WO | 2009/036580 | 3/2009 |

* cited by examiner

*Primary Examiner* — Mark A Deuble  
(74) *Attorney, Agent, or Firm* — Rankin, Hill & Clark LLP

(57) ABSTRACT

A deflection mechanism (1) for a conveying system including a central member (5) with a rolling element (20) that revolves around the central member (5). The rolling element (2) has a plurality of guided rolls (3) which roll within a raceway (13) of the central member (5). The shape of the central member (5) is adjustable such that a deflection angle of the deflection mechanism (1) can be adjusted.

18 Claims, 4 Drawing Sheets

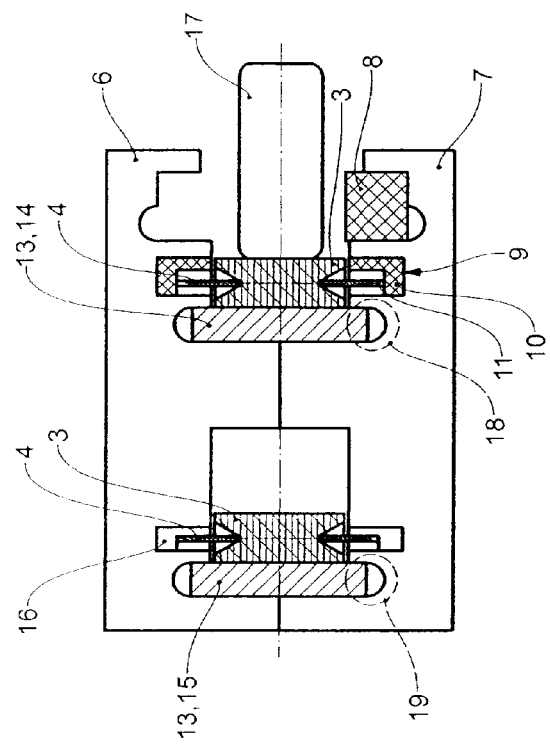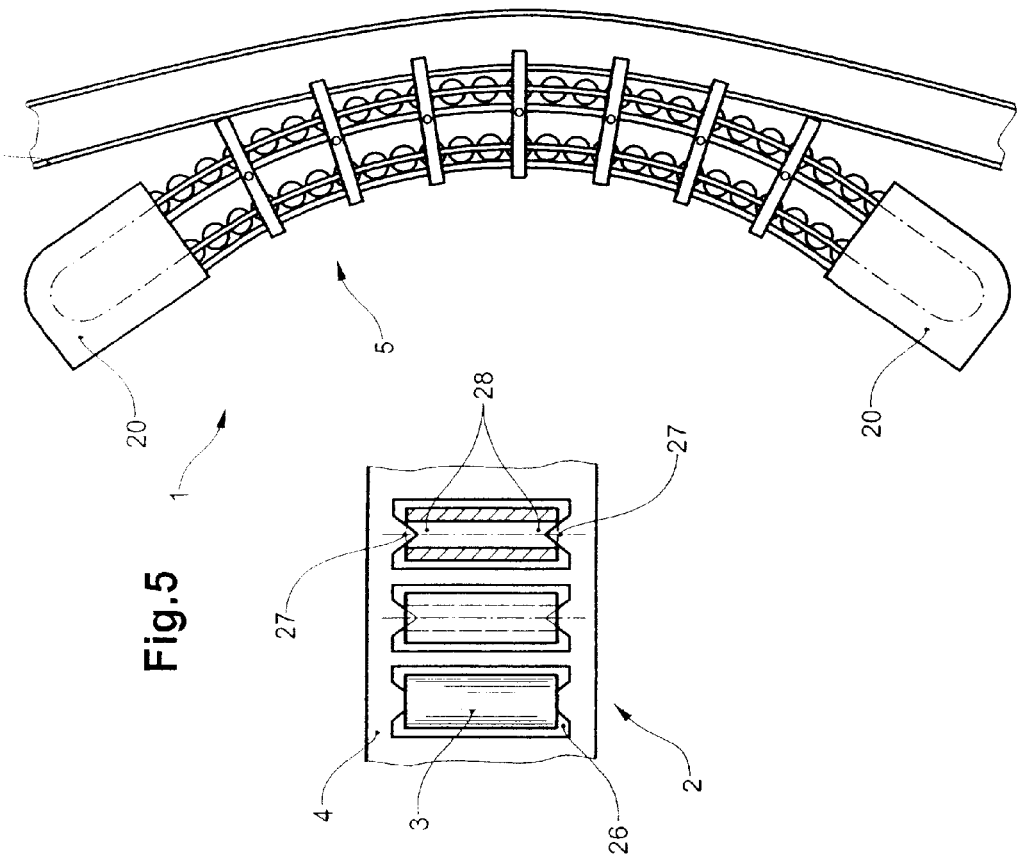

DEFLECTION APPARATUS FOR A CONVEYING SYSTEM

BACKGROUND OF THE INVENTION

1. Field of the Invention

The invention relates to the field of materials conveying technology. It relates, in particular, to a deflection apparatus for a conveying system.

2. Description of Related Art

Conveying devices typically comprise conveying elements, belts, chains, cables, bands, wheels, etc., which are generally conveyed along three-dimensionally running tracks. The conveying elements are here pushed and/or pulled by a drive mechanism. In the rounding of curves, friction forces are generated, which act counter to the drive mechanism. In order to reduce these friction forces, it is known, for instance from WO 99/35063, to arrange fixedly mounted rollers in a deflection region. The mounting of the rollers, however, creates friction and noise.

Another deflection apparatus is known, for instance, from DE 101 35 659 A1. In this, in a conveying apparatus, an endless supporting chain is provided, which supports a side-arc chain of the conveying apparatus in a curve. For this purpose, protruding carrying elements are fitted to the supporting chain, which press against the side-arc chain and in this way support the same. The structure of the apparatus as a whole is complex.

In WO 2007/045 105, cylindrical deflection rollers for a cable conveying system having two parallel cables are disclosed. At each deflection of the cable pair—regardless of whether the deflection angle is, for example, 10° or 180°—a deflection cylinder having a correspondingly large diameter, and thus also having a corresponding inertia of mass, is necessary.

The previously known deflection apparatuses are oriented to fixed, predetermined deflection angles. If another deflection angle is necessary, an adapted deflection apparatus has to be designed and built.

BRIEF SUMMARY OF THE INVENTION

The object of the invention is therefore to provide a deflection apparatus for a conveying system of the type stated in the introduction, which deflection apparatus eliminates the above-stated drawbacks. In particular, one object is to provide a low-friction deflection apparatus which also has a simple structure, is favorable in terms of manufacture and assembly and can be supplied and assembled as a compact, autonomous structural unit. A further object is to provide a deflection apparatus which can be easily adapted to different geometric conditions.

This object is achieved by a deflection apparatus for a conveying system.

The deflection apparatus for a conveying system, thus, comprises a central body with a roller body circulating around the central body, wherein the roller body comprises a multiplicity of rollers, which are guidedly moved and roll in a roller track of the central body, wherein the central body is adjustable in its shape and hence a deflection angle of the deflection apparatus is adjustable.

It is possible here to design the deflection apparatus such that the roller body does not circulate fully around the central body, but only along a portion of the central body. Such a deflection apparatus is, thus, only suitable for supporting to and fro motions. This does not require return guidance of the roller body around the central body, whereby the spatial requirement is reduced.

Preferably, a front roller track is provided in order that further bodies roll on it over the rollers, and the front roller track is produced from a flexible material. At least the front roller track is bendable and/or twistable for adaptation to a predetermined track path, but preferably the central body is bendable and/or twistable in its entirety jointly with the front roller track. In particular, a return roller track, along which the rollers rolling on the front roller track are returned, can thus also be bent or twisted jointly with the front roller track. A path of the deflection apparatus which is freely guidable in three dimensions (with due regard to minimal bending radii) is thus obtained. In contrast to a rigid deflection apparatus, a deformation of the deflection apparatus by a deflection angle of at least 5° or at least 10°, for instance, is possible.

The front roller track and the return roller track preferably run at a substantially constant distance apart and, to this end, are connected to each other by means of connecting elements. These connecting elements are preferably fastened or detachably connected by means of connections to the front roller track and/or to the return roller track. Preferably, at least a part of the connections is detachable in order to adjust the shape of the central body and is fixable in order to fix the shape of the central body.

The return roller track, like the front roller track, can consist of a flexible material and can extend along the whole of the central body. It can also, however, consist of separate individual portions, which are each connected by the connecting elements to the front roller track and, upon deformation of the central body, are mutually movable. The mobility of the central body is thereby improved and, for the bending of the central body, no connections have to be undone. Instead, in order to fix the shape of the central body, the latter must however be fastened to the conveying system by means of retaining elements.

In a further preferred embodiment of the invention, the front roller track and the return roller track are formed adjacent to each other in one piece from a flexible plastic. The resulting body can, thus, be shaped as an endless profile, one piece of which, if need be, can be cut to a desired length. In the region of the return roller track, the body can be ribbed or slotted in order to improve the pliability. Manufacturing methods for such profiles are known, for instance, for the manufacture of electropipes or ventilation pipes made of polyethylene.

Regardless of the precise embodiment of the roller tracks, the deflection apparatus preferably comprises at the two ends of the central body a respective end piece for deflecting the roller body from the front roller track to the return roller track (or vice versa).

In the bending of the central body, differences in length between the front roller track and the return roller track must be compensated, similarly differences in length between the central body and the roller body. To this end, either the different elements are connected to one another, for bending purposes, such that they can be detached and subsequently re-fixed, or they are connected to one another such that they can be slidingly moved at one or more locations. The whole of the central body, or just a thin part of the central body, which forms the roller track, is thus formed from a flexible material. This is clamped in place in a certain angular configuration, and can be released and reclamped at another angle.

Depending on the embodiment, this fixability or mobility can be embodied between the roller tracks and the connecting elements, and/or between the roller tracks and the end pieces.

In order to compensate the length of the roller body with respect to the front roller track and/or the return roller track, at least one of the end pieces is displaceable in the longitudinal direction of the roller tracks. The length of the roller body can alternatively also be compensated by a separate tensioning element, for instance by a movable deflection in the region of the return roller track.

The deflection apparatus preferably forms an independent structural unit, which can be assembled, disassembled and transported as a unit and can, thus, be installed in a flexible manner in order to deflect or support a conveying means in a conveying system in case of a change of direction. The conveying means is, for instance, a conveyor belt formed from one piece or from individual consecutive support elements, or a conveying chain or a cable conveyor, etc. The conveying means thus rolls over the rollers on the central body. The pressure between the conveying means and the central body is transmitted by the rolling rollers without a bearing support of the shafts of the rollers being placed under substantial load. This bearing support serves merely to distance the rollers from one another and to prevent them, in the unloaded state, from falling out.

Since the deflection apparatus is an independent structural unit, which has only to be mounted such that it acts against the conveying means, without the need for additional elements to be interlocked with the conveying means or be individually mounted, it becomes possible to set up and modify modular conveying systems in a quick and easy manner, as in a modular construction system.

Preferably, the deflection apparatus is realized in lightweight construction, with rollers made from plastic, for instance, and the central body from plastic or aluminum. The rollers can be produced for higher loads, essentially also as solid cylinders, or from sleeves made from aluminum or from steel (plate). A smooth-running system with low inertia of mass and with low energy losses is thereby created. Since no significant friction forces are generated—compressive forces are transmitted by the rollers without friction on a shaft—the deflection apparatus can be operated without lubricant and is hence less prone to dirt contamination.

The deflection apparatus can be arranged as a unit for a horizontal or vertical deflection, or for a deflection lying obliquely in space. In a preferred embodiment of the invention, the rollers run (in accordance with a path of the conveying means) along a twisted track. Such twisting of the track can be present in a straight or curved region of the roller track. It is also possible here to clamp the conveying means, for example a chain of rigid conveying elements, between two deflection apparatuses according to the invention and to guide said conveying means along a twisted path which is curved in three dimensions in space.

In another use of the deflection apparatus, it is used to deflect conveyed objects at the edge of a conveying apparatus. In a preferred embodiment of the invention, the deflection apparatus is for this purpose also movable within itself during operation of the conveying apparatus and can be adjusted by a drive mechanism in order to direct the movement of the conveyed objects according to choice.

The shape of the deflection apparatus is substantially defined by the shape of the flexible central body and, if the deflection apparatus forms an arc, corresponds, for instance, to a desired deflection angle. The deflection apparatus can also be brought into complicated shapes, for instance an S-bend or a spatial path with curvatures along axes standing obliquely to one another. The deflection angle measures, for instance, between 0 degrees and 360 degrees. Along this deflection angle, or, in other words, in a rolling region, the conveying means is supported by the roller body of the deflection apparatus, or the conveying means rolls on the roller body. Preferably, the return circuit of the roller body runs outside the rolling region on the shortest route, or else in a curved track running roughly parallel to the rolling region. The deflection apparatus, in comparison to a cylindrical deflection apparatus, hence occupies substantially less space.

In a preferred embodiment of the invention, the rollers are guided in a roller belt and are distanced from one another. Preferably, the roller belt is produced from a flexible flat material, in particular from a fabric tape or plastic-permeated fabric. Further preferred usable embodiments of roller belts are disclosed in WO 2006/094423, in particular in FIGS. 8 to 18 and the corresponding sections of the description, the content of which is herewith included in its entirety by reference. For instance, a roller belt between the mountings of the rollers can also comprise a preferably central constriction, so that the roller belt is bendable, together with the central body, also about an axis perpendicular to the plane of the roller belt.

Preferably, the roller belt comprises recesses having bearing projections, and the rollers, with indentations, are inserted in the bearing projections and are thus loosely supported by the bearing projections. The rollers are shaped cylindrically, or alternatively also slightly cambered, i.e. barrel-shaped, the roller track being correspondingly concave in shape. Axial forces—in the case of vertical arrangement of the rollers, this essentially corresponds only to the weight of the rollers—are hence transmitted to the roller track without the rollers, on their end face, coming into contact with the roller track and rubbing.

In another preferred embodiment of the invention, the roller belt runs with its two outer edges in a belt-guiding groove of the central body and is thereby guided and prevented from falling out. The belt-guiding groove thus prevents the roller body from falling out of the central body. The belt-guiding groove is shaped in a part of the central body and forms, in principle, a slot running around the central body. Alternatively, the belt-guiding groove can also be arranged only in the region of the front roller track, in which case the roller body, in the region of the return circuit, runs partially freely, i.e. not necessarily in a belt-guiding groove. As a result of the freer or looser guidance in the region of the return circuit, inaccuracies and changes in the length of the roller body are able to be compensated.

In other preferred embodiments of the invention, the roller body is formed from a multiplicity of individual rollers which are not chained together. The rollers are arranged such that they roll around the central body and are distanced from one another by distancing bodies. The distancing bodies are mounted rotatably on the shafts of the rollers, preferably at both ends of the rollers, next to a rolling part of the rollers, and prevent the rotating rollers from touching one another.

Other roller shapes and other types of roller belts, or rollers guided individually in the flexible central body, can also thus be used. Such rollers, roller belts and individually mounted rollers are described in Swiss patent application 1448/07 with application date Sep. 17, 2007, and further applications which claim the priority of said application, which are herewith included in the description by reference.

Further preferred embodiments emerge from the dependent patent claims. By analogy, features of the method claims can here be combined with the apparatus claims, and vice versa.

BRIEF DESCRIPTION OF THE DRAWINGS

The subject of the invention is explained in greater detail below with reference to preferred illustrative embodiments represented in the appended drawings, in which, respectively in schematic representation:

FIG. 1 shows a top view of a deflection apparatus on a conveying system;

FIG. 3 shows a cross section through the central body of FIG. 1;

FIG. 5 shows a top view of a portion of a roller belt;

The reference symbols used in the drawings, and the meaning thereof, are listed in summarized form in the reference symbol list. In the figures, identical and functionally identical parts are fundamentally provided with the same reference symbols.

DETAILED DESCRIPTION OF THE INVENTION

A first preferred embodiment of the invention is described with reference to FIGS. 1 to 4. FIG. 1 shows schematically a deflection apparatus 1 having a central body 5 and two end pieces 20, mounted on a mounting 12 of a conveying system.

Figure 2:
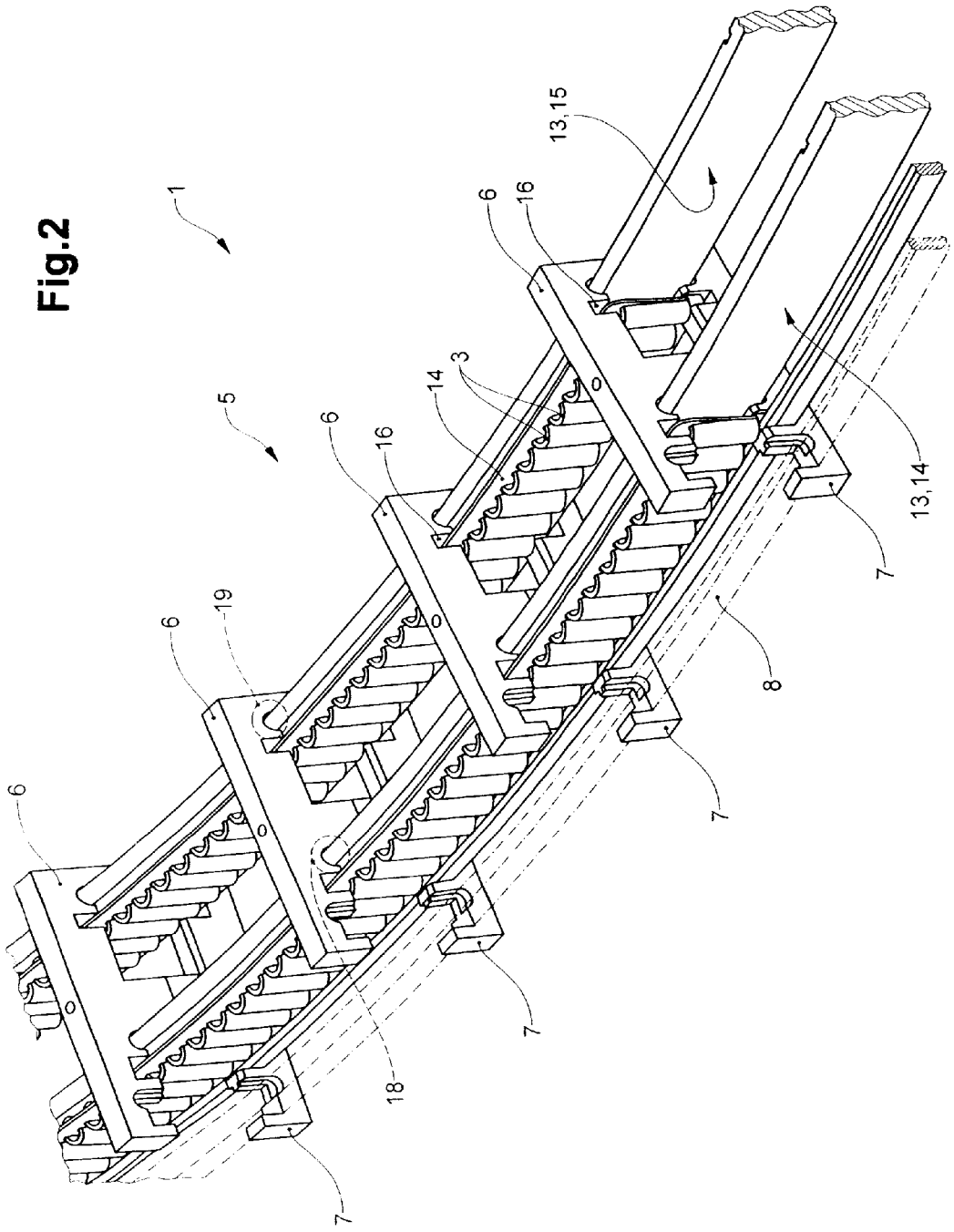
FIG. 2 shows a view of a part of a central body.

FIG. 2 shows a view of a part of a central body, and FIG. 3 shows a corresponding cross section. The central body 5 for the guidance of a roller body 2 is of multipart construction and comprises:

- a roller track 13, which in turn comprises a front roller track 14 and a return roller track 15. The two parts of the roller track 13 run at a substantially constant distance apart.
- connecting elements 6, which interconnect the front roller track 14 and the return roller track 15 in a web-like manner. The connecting elements 6 further comprise retaining elements 7 for fastening the central body 5 or the deflection apparatus 1 to correspondingly shaped retaining means 8, 12 of a conveying system, illustrated in FIG. 2, by way of example, as a retaining web 8.
- a belt guide 10 consisting of a lower and an upper part, with a respective belt-guiding groove 11 running therein. The belt guide 10 runs at a constant distance in front of the front roller track 14 and is held in belt-guiding slots 9 of the connecting elements 6. For the guidance of the roller body 2 on the return roller track 15, a dedicated belt guide can also be provided, or else, as shown here, only elements for the return belt guide 16, which are configured on the connecting elements 6.
- end pieces 20 for the deflection of the roller body 2 (see, in this regard, FIG. 4).

The parts 6, 10, 14, 15 of the central body 5 are connected to one another in a mutually movable or detachable manner in order to adjust or set a deflection angle and/or a torsion (twisting) of the central body 5. Individual parts or all parts are preferably fixable in a chosen reciprocal position, so that the central body 5 stably maintains the chosen shape. In other applications, the parts remain mutually movable, the shape of the central body 5 being defined by fastening to fastening points 8, 12 of a conveying system. For instance, the connecting elements 6 are attached by means of first connections 18 to the front roller track 14, and by means of second connections 19 to the return roller track 15. For the setting of a predetermined bending radius, the first connections 18 and/or the second connections 19 are released, the front roller track 14 and the return roller track 15 are brought into the desired bending, and the connections 18, 19 are re-fixed. At the same time or subsequently, the belt guides 10 are inserted into the connecting elements 6. The release and fixing of the connections 18, 19 can be realized, for example, by clamping in the connecting elements 6, or by means of special clamping elements or screws, etc.

A roller body 2 comprises a roller belt 4 with rollers 3 held therein. The rollers 3 are guided in the roller belt 4 and are distanced from one another. The rollers 3 roll at least on the front roller track 14 and, in doing so, can absorb load forces from further bodies 17 which roll on the rollers 3 and transmit said load forces to the front roller track 14. Lateral regions of the roller belt 4 run with their outer edges in the belt-guiding grooves 11, whereby the movement of the roller belt 4 is guided, limited to a movement parallel to the front roller track 14, and is prevented from falling out. In place of the belt-guiding grooves 11, the belt guide 10 can also merely comprise a front wall portion, which prevents the movement of the roller belt 4 away from the respective roller track 14, 15 (together with the limitation of the movement in the direction transversely to the roller belt). The movement in the direction of the respective roller track 14, 15 is, of course, itself limited by this.

The roller belt 4 is preferably produced from a fabric or a plastic-impregnated fabric. It comprises, for instance, recesses with bearing projections, where the rollers 3 are inserted with indentations in the bearing projections and, thus, loosely supported by the bearing projections. Detailed embodiments of roller belts are described in Swiss patent application 1448/07 cited in the introduction.

FIG. 5 shows a top view of a portion of a roller belt 4, with, in part, inserted rollers 3. The roller belt 4 comprises successive recesses 26, each recess 26 respectively comprising on both sides of the belt an inward-pointing bearing projection 27. The rollers 3 are provided at their axial ends with indentations 28 (which, as shown, can also be continuous, with the result that the rollers 3 respectively form pipes), so that the bearing projections 27 of the flexible roller belt 4 can snap into or be introduced into the indentations 28. The roller belt 4, on the one hand, comprises such flexibility that it can be bent to run round the central body 5 and, on the other hand, is stable or stiff enough that the rollers 3, following insertion into the recesses 26, are held by the bearing projections 27. The bearing projections 27 generally support only the weight of the rollers 3.

In order to form a closed loop, the roller belt 4 is preferably placed with its two ends one against the other, and the two ends are connected to each other by means of at least a film stuck to the roller belt.

Figure 4:
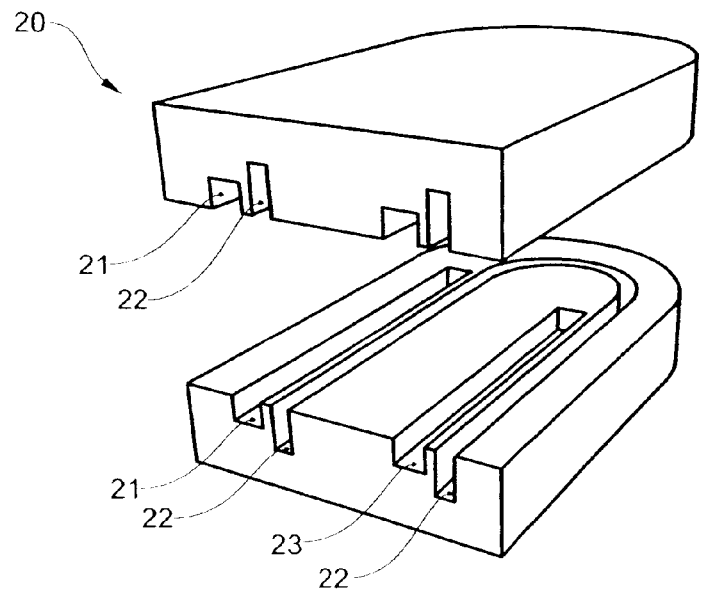
FIG. 4 shows an end piece to the central body of FIG. 1.

FIG. 4 shows an end piece to the central body of FIG. 2. The end piece 20 is formed from two correspondingly shaped halves, which respectively comprise grooves in which the roller tracks 13 and the belt guides 10 end and are held displaceably or non-displaceably. A first groove 21 receives the return roller track 15, a second groove 23 the front roller track 14, and a third groove 22 the belt guide 10. The third groove 22 is curved and runs for deflection of the roller belt 4 back to a location in front of the first groove 21. The parts of the end piece 20 are connected by means of fastening means (not shown) both to one another and to the other parts of the central body 5. In a preferred embodiment of the invention, the end piece 20, at least at one end of the central body 5, is displaceable by a predetermined distance with respect to the other parts. Differences in length both between the roller tracks 13 amongst themselves and relative to the roller body 2, which differences arise in the bending of the central body 5, can thereby be compensated.

Figure 6:
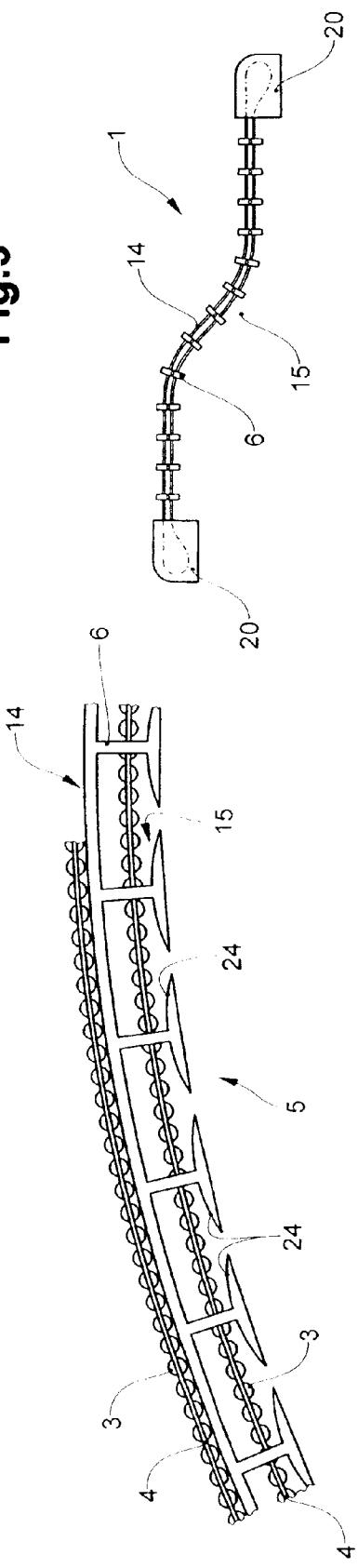
FIG. 6 shows another variant of a central body.

FIG. 6 shows another variant of a central body 5. The return roller track 15 here does not consist of a single, continuous track, but of individual track portions 24. These track portions 24 are not fastened to one another, but remain movable relative to one another. For this purpose, they are either distanced apart, as illustrated, or bear movably against one another, for instance with an overlapping or an interlocked region. A track portion 24 is respectively fixed to a connecting element 6. Thus, the central body 5 can be brought into a desired shape by buckling or twisting of the front roller track 14—within certain boundaries—without connections between the front roller track 14 and the return roller track 15 having to be released. This requires the central body 5 to be stabilized in its shape by other means, for instance by the retaining elements 7.

Figure 7:
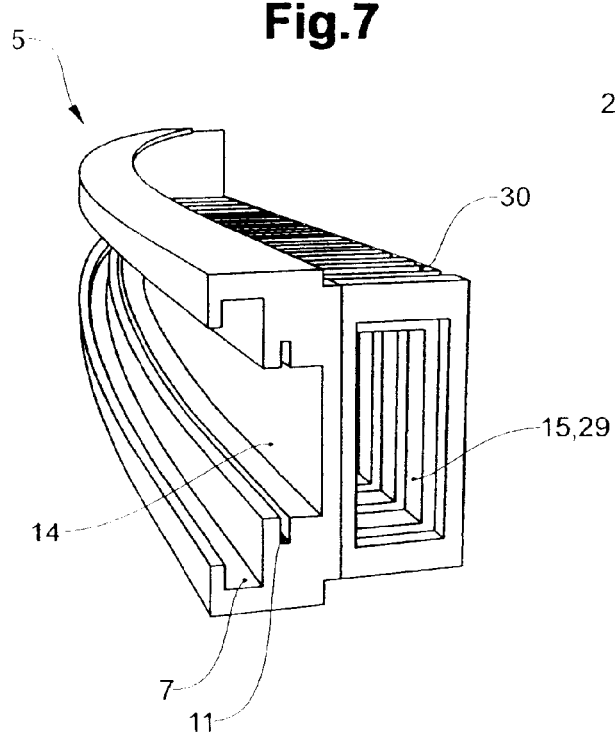
FIG. 7 shows a further variant of a central body.

FIG. 7 shows a further variant of a central body 5. In this, the central body 5 forms in the region of the return roller track 15 a pipe 29, in which the roller body 2 runs back under protection. The return circuit lies directly behind the front roller track 14, whereby a narrow and space-saving structure is obtained. In order to facilitate the bending of the central body 5, the pipe is preferably ribbed, with ribs 30.

The embodiments of FIGS. 6 and 7 are preferably produced in one piece from a flexible plastic. Retaining elements 7 and belt-guiding groove 11 are likewise formed onto the one-piece central bodies 5. Thus, the central bodies 5 can be produced as endless products, if need be cut to a desired length, and can be provided with correspondingly shaped end pieces 20.

Figure 8:
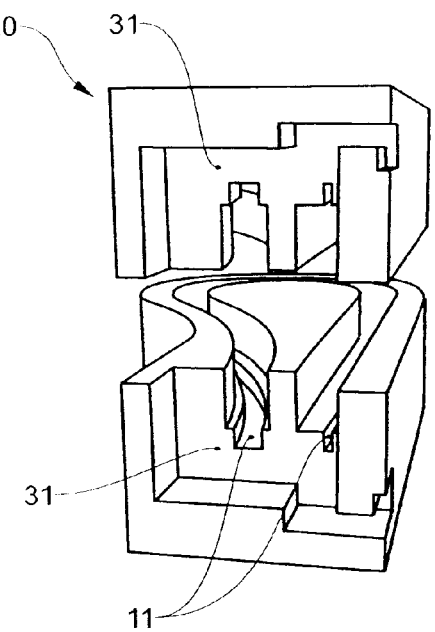
FIG. 8 shows an end piece to the central body of FIG. 5.

FIG. 8 shows an end piece 20 to the central body of FIG. 7. The working is the same as in that of FIG. 5, the shape is tailored to the narrow shape of the central body 5 to ensure that a minimal bending radius of the roller body 2 is not undershot. The end piece 20 comprises two halves, each of which comprises a cavity 31 into which the central body 5 according to FIG. 7 can be inserted. Preferably, the central body 5 is displaceable in its longitudinal direction in the cavity 31, in order to compensate for differences in length. Elements for fixing the central body 5 to the end piece 20 are not illustrated. A certain length compensation can also be realized by a relatively loose guidance of the roller body 2 in the pipe 29.

Figure 9:
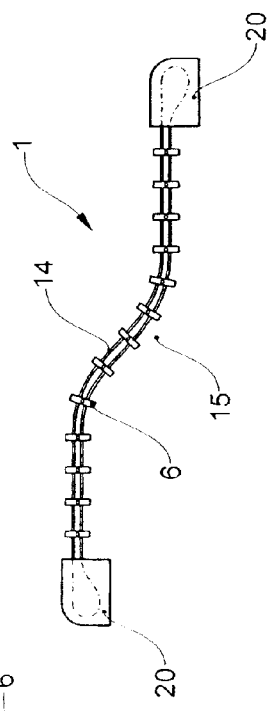
FIG. 9 shows an illustrative track guide.

FIG. 9 shows schematically an illustrative track guide comprising a central body 5 running in an S-shape. Here, similar to in the central body 5 of FIG. 7 and with an end piece 20 analogous to that of FIG. 8, the two roller tracks 14, 15 are disposed close to each other. The pliability of the central body 5 thereby improves. Of course, the end piece 20 can also be realized as in FIG. 4, the roller tracks 14, 15, respectively in a region adjoining the end pieces 20, being moved close together.

Figure 10B:
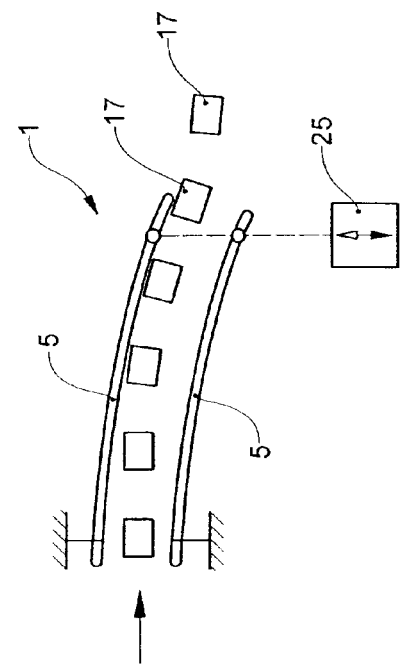
FIG. 10 shows a deflection apparatus which is adjustable during operation.
Figure 10A:
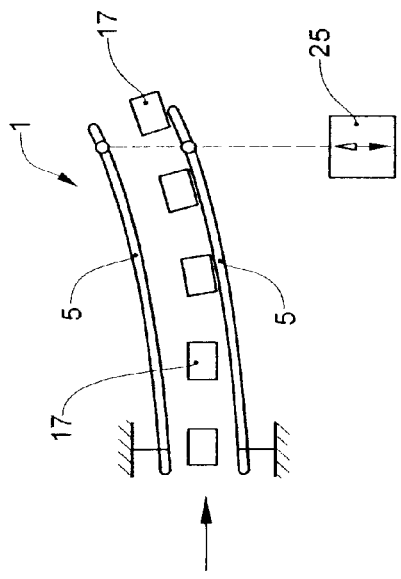

FIG. 10 shows in a schematic top view a deflection apparatus which is adjustable during operation. This comprises two central bodies 5 according to the invention, which are movable in themselves. These are disposed above a conveying means, such as, for instance, a conveyor belt (not illustrated) to the left and right of a conveying track and are adjustable by a drive means 25, here a linearly displaceable actuating member, in their shape. In a first position a), conveyed further bodies 17 are guided to the left, in a second position b) to the right. The further bodies 17 here roll on the rollers 3 of the deflection apparatuses 1. A low-friction deflection of the conveyed bodies 17 is thereby obtained.

REFERENCE SYMBOL LIST 1 deflection apparatus
2 roller body
3 roller
4 roller belt
5 central body
6 connecting element
7 retaining element
8 retaining web
9 belt-guiding slot
10 belt guide
11 belt-guiding groove
12 mounting
13 roller track
14 front roller track
15 return roller track
16 return belt guide
17 further body
18 first connections
19 second connections
20 end piece
21 first groove
22 third groove
23 second groove
24 track portion
25 drive means
26 recess
27 bearing projection
28 indentation
29 pipe
30 ribs
31 cavity

The invention claimed is:

1. A deflection apparatus for a conveying system, wherein the deflection apparatus comprises:
   a central body;
   with a roller body circulating around the central body,
   wherein the roller body comprises a multiplicity of rollers, which are guided and roll in a roller track of the central body, and
   wherein the central body is adjustable in its shape and hence a deflection angle of the deflection apparatus is adjustable.

2. The deflection apparatus for a conveying system as claimed in claim 1, wherein the roller track is formed from a flexible material, and can be clamped in place in a certain angular configuration, released and reclamped at another angle.

3. The deflection apparatus for a conveying system as claimed in claim 1, wherein a front roller track is provided in order that further bodies roll on the front roller track over the rollers, and the front roller track is produced from a flexible material.

4. The deflection apparatus for a conveying system as claimed in claim 3, wherein at least the front roller track is bendable and/or twistable for adaptation to a predetermined track path.

5. The deflection apparatus for a conveying system as claimed in claim 3, wherein the front roller track and a return roller track, along which the rollers rolling on the front roller track are returned, run at a substantially constant distance apart, and the front roller track and the return roller track are connected to each other by means of connecting elements.

6. The deflection apparatus for a conveying system as claimed in claim 5, wherein the connecting elements are detachably connected by means of connections to the front roller track and/or to the return roller track, and these connections are detachable in order to adjust the shape of the central body and are fixable in order to fix the shape of the central body.

7. The deflection apparatus for a conveying system as claimed in claim 5, wherein the rollers are guided in a roller belt and are distanced from one another, and the connecting elements support a belt guide for guiding the roller belt, wherein the roller belt runs with its two outer edges in each case in a belt-guiding groove of the belt guide and is thereby guided and prevented from falling out.

8. The deflection apparatus for a conveying system as claimed in claim 5, wherein the connecting elements comprise retaining elements for fastening the deflection apparatus to the conveying system.

9. The deflection apparatus for a conveying system as claimed in claim 5, wherein the return roller track consists of separate individual portions, which are connected by the connecting elements to the front roller track and, upon deformation of the central body, are mutually movable.

10. The deflection apparatus for a conveying system as claimed in claim 5, wherein the front roller track and the return roller track are formed adjacent to each other in one piece from a flexible plastic.

11. The deflection apparatus for a conveying system as claimed in claim 10, wherein the body formed in one piece from the front roller track and from the return roller track is ribbed or slotted in the region of the return roller track in order to improve the pliability.

12. The deflection apparatus for a conveying system as claimed in claim 5, further comprising two end pieces for the deflection of the roller body at the ends of the central body, wherein preferably at least one of the end pieces is displaceable in the longitudinal direction of the roller tracks for length compensation with respect to the front roller track and/or the return roller track.

13. The deflection apparatus for a conveying system as claimed in claim 1, wherein the central body is bendable and/or twistable jointly with the front roller path.

14. The deflection apparatus for a conveying system as claimed in claim 1, wherein the roller body does not circulate fully around the central body, but only along a portion of the central body.

15. The deflection apparatus for a conveying system as claimed in claim 1, further comprising a drive means for adjusting the shape of the deflection apparatus during operation of the deflection apparatus.

16. The deflection apparatus for a conveying system as claimed in claim 1, wherein the deflection apparatus is realized in lightweight construction, in particular with rollers made from plastic and the central body from plastic or aluminum.

17. The deflection apparatus for a conveying system as claimed in claim 1, wherein the rollers are guided in a roller belt and are distanced from one another, and the roller belt is manufactured of a flexible flat material.

18. The deflection apparatus for a conveying system as claimed in claim 17, wherein, in order to form a closed loop, the roller belt is placed with its two ends one against the other, and the two ends are connected to each other by means of at least a film stuck to the roller belt.

* * * * *